United States Patent [19]

Moss

[11] 3,903,502

[45] Sept. 2, 1975

[54] CHARACTER RECORDING SYSTEM

[75] Inventor: David Moss, Dayton, Ohio

[73] Assignee: Creative Ventures Inc., Dayton, Ohio

[22] Filed: Aug. 29, 1973

[21] Appl. No.: 392,782

[52] U.S. Cl. .......... 340/146.3 SY

[51] Int. Cl.$^2$ .......... G06K 9/00

[58] Field of Search .......... 340/146.3 SY, 146.3 MA, 340/146.3 J, 146.3 A, 146.3 Z

[56] References Cited

UNITED STATES PATENTS

| | | | |
|---|---|---|---|
| 3,127,588 | 3/1964 | Harmon | 340/146.3 SY |
| 3,182,291 | 5/1965 | Nassimbene | 340/146.3 SY |
| 3,253,258 | 5/1966 | Hughes | 340/146.3 SY |
| 3,462,548 | 8/1969 | Rinder | 340/146.3 SY |
| 3,485,168 | 12/1969 | Martinson | 340/146.3 A |
| 3,487,371 | 12/1969 | Frank | 340/146.3 SY |
| 3,500,323 | 3/1970 | Funk | 340/146.3 SY |
| 3,727,032 | 4/1973 | Olmstead | 340/146.3 Z |

*Primary Examiner*—Leo H. Boudreau
*Attorney, Agent, or Firm*—Biebel, French & Bugg

[57] ABSTRACT

Systems and method are disclosed for guided hand scribing of characters in human readable form, which characters can be simultaneously or subsequently recognized and encoded, processed, etc., by appropriate equipment. Different forms of scribe members and related encoding equipment are also disclosed. These operate on the premise that characters are uniquely defined by the termini of the scribing strokes which make up the character, these termini having predetermined relation to the boundaries of cells in a matrix, in which cells the characters are scribed.

21 Claims, 7 Drawing Figures

CHARACTER RECORDING SYSTEM

BACKGROUND OF THE INVENTION

This invention relates to a system for the automatic recording of characters, wherein identification of unique characters is achieved, by sensing the positional relationship of a scribe member with respect to a matrix on which the characters are scribed or by sensing the positions of a mark etc. left on the matrix. The invention is particularly useful in connection with automatic recording of character information at the same time the characters are written on order blanks, entry sheets, or the like.

Various proposals have been made for such systems. However, for one reason or another these systems have been found lacking in practicality, and as a result they have not become commercially available. One of the most prevalent systems in the prior art is the quadrant-type of recognition device exemplified by systems disclosed in U.S. Pat. Nos. 3,145,367, 3,182,291, 3,462,548 and 3,701,098. The basic concept underlying the systems shown in those patents involves detection of motion of the writing instrument in any of four different directions, or combinations thereof. These systems require, however, that the scribe member motion be detecting in four different directions, for example as shown in U.S. Pat. Nos. 3,145,367 or 3,462,548, or else four separate detectors are required such as shown in U.S. Pat. Nos. 3,182,291 and 3,701,098. Furthermore, the sequence of motions required by these systems is inflexible, thus it is necessary to train someone using the device always to form particular characters with precisely the same strokes and in the same sequence. As a result, there is little latitude in such systems to accommodate the uniqueness of each individual's handwriting.

Other systems have been described which require tracing over a certain format, but these limit the number and style of characters which can be used, and they are not readily compatible with ordinary handwriting. Typical of such systems are those described in U.S. Pat. Nos. 2,963,220, 3,485,168 and 3,626,368. Also of interest, but not specifically pertinent because they do not provide for recording of handwritten characters, are U.S. Pat. Nos. 3,303,468 and 3,559,170. These patents relate to recognition equipment capable of mechanical and/or optical recognition of handwritten characters so long as these characters are accurately and properly placed.

An earlier form of character recognition equipment is disclosed in U.S. Pat. No. 1,117,184. The characters are handwritten with special electrically conductive ink, over a matrix pattern which corresponds to the contact sequence of a scanner. The scanner is in the form of a reader brought into contact with the conductive ink to produce a code sequence when the individual characters are scanned.

Another type of recognition system is disclosed in U.S. Pat. No. 3,699,518. That device also relates to machine reading of handwritten characters, but again it requires that these characters be carefully placed within certain guides, and over complicated matrix information onto which the handwritten characters are scribed.

Thus, although there has been substantial activity in this filed, there still exists a need for a simple hand operated device and system which can translate manual scribing motion of a scribe member into signals defining unique handwritten characters, with due regard to the individual uniqueness of handwriting.

SUMMARY OF THE INVENTION

The present invention provides a method and system, including writing instruments and corresponding matrices, together with related electronic equipment, which is capable of defining in code form handwritten human readable characters, and to perform such a function while the characters are being written. The system includes logic equipment capable of translating positional relationships between the scribe member of the writing instrument and a matrix or between marks left by the scribe member on the matrix, into unique signals which identify particular characters.

One important feature of the present invention is the fact that character identification is achieved by defining, encoding, and translating the position of the scribe member or marks only at the terminal (beginning and/or the end) of one or more writing strokes. Thus, the user of the equipment is free to exercise some individual quality of his handwriting, being confined only to the extent that the characters must be written with one or two (or even more) consecutive strokes, and each stroke must begin and end at predetermined locations within the matrix. Each character is formed within a cell of the matrix, and movement of the scribe member from one cell to another may be sensed and utilized to define the end of a character. A signal so derived may also be used, if desired, to perform some arithmetical operation should the consecutive characters be numeric and should it be desired to, for example, sum them in some particular fashion.

The apparatus may take different forms in accordance with the invention, however the preferred embodiment disclosed hereafter is believed to be the most useful embodiment from the standpoint of simplicity, ease of manufacture, use by the writer, and overall adaptability.

DESCRIPTION OF THE PREFERRED EMBODIMENT

Figures 3, 4, 5, 6, 7:
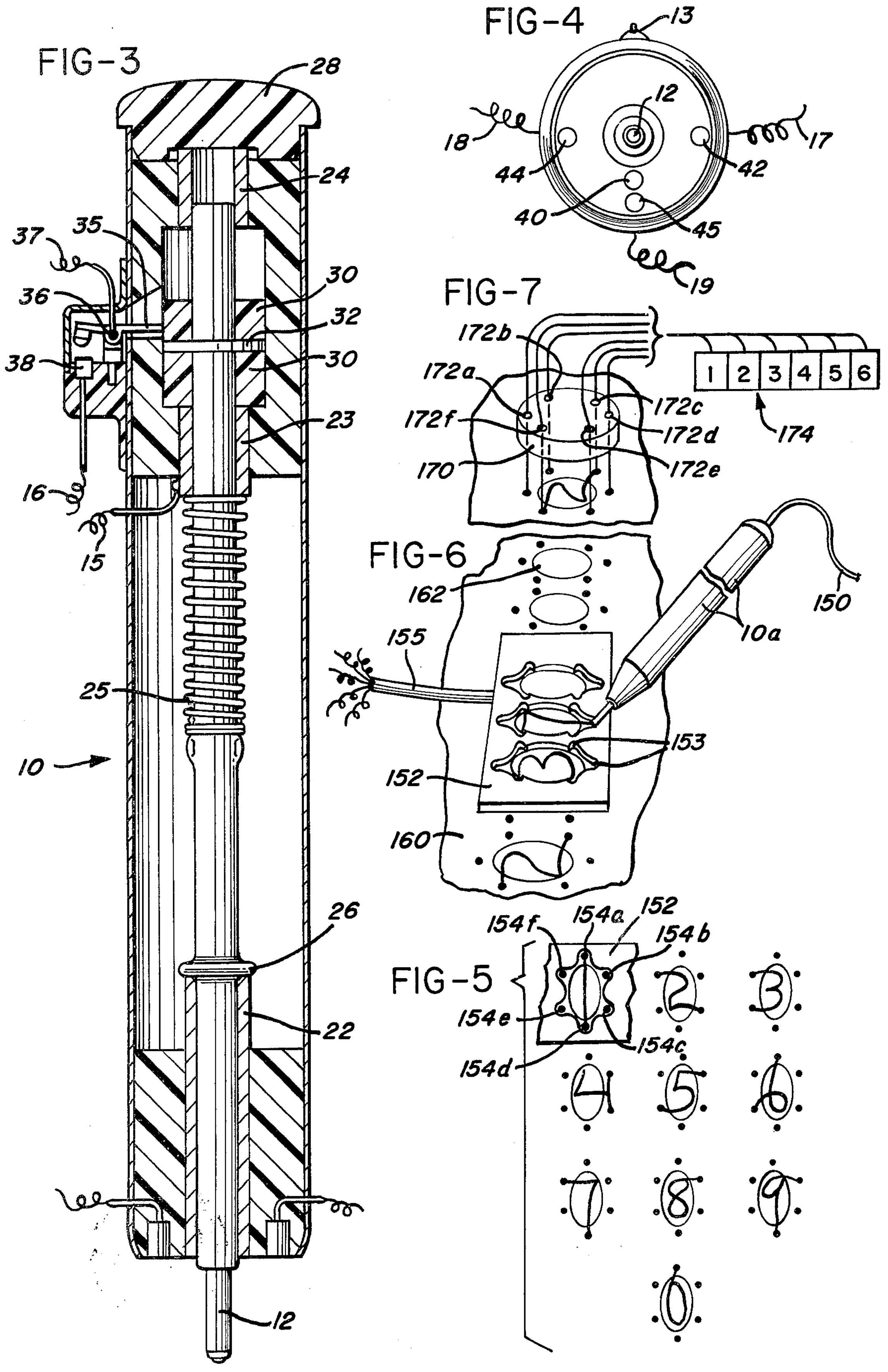
FIG. 3 is an enlarged cross-sectional view showing details of the scribe member, its holder, and related parts and controls.
FIG. 4 is a bottom view of the member shown in FIG. 1, illustrating the relative location of the scribe member itself, a light source, and three photosensors.
FIG. 5 is another embodiment of matrix in accordance with the invention, shown with parts broken away for better illustration.
FIGS. 6 and 7 show a modified form of scribe member.

Referring to FIG. 3, the writing and/or tracing implement, adapted to be manipulated manually in the same manner as a pencil or pen, is shown by the general reference 10, and incorporates a scribe member 12, the tip of which is shown protruding from the lower end of the member. Various electrical connections are shown as separate lines, for purposes of illustration, but it will be understood that in an actual embodiment these lines are grouped as a small lightweight cable which leads from the member 10 in such a way that it does not interfere with normal use of the device in much the same manner as a regular writing instrument. These lines provide binary type signals, either in the form of pulses or OFF-ON electrical levels, which can be described as follows. An indicator 13 (FIG. 4) shows the correct orientation of the scribe member. This could also be accomplished by contouring the body to fit the hand in a particular way.

Line 15 carries pulse signals which indicate movement of scribe member 12 in an upward or downward direction within its mounting, this being indicitive of application or removal of the scribe member to the matrix (FIG. 2) for the purpose of scribing characters thereon. A pulse is transmitted over line 15 to amplifier 15A every time that the scribe member moves either in an upward or downward direction within its mounting, thus each pulse indicates the beginning or end of a scribing stroke.

Line 16 is connected to a position sensor for the scribe member and provides either a high or low level signal through its amplifier 16A distinguishing between the up and down positions of the scribe member. Thus this signal is an indication of whether the pulse on line 15 occurred during a beginning (putting scribe member to matrix) or an ending (lifting scribe member from matrix). Lines 17 and 18 provide to the respective amplifiers 17A and 18A high or low level signals from sensors which indicate position of the scribe member 12 within a cell of the matrix. The outputs from these lines (17 and 18) are controlled, as will be described, to provide encoding signals only at the beginning and at the end of scribing strokes. Line 19 provides an output from a further sensor to its amplifier 19A, and high or low level signals at this input indicate further movements of the scribe member, for example from one cell to another, as will be explained.

Referring to FIG. 3, the instrument 10 is shown as including an elongated body 20 within which the scribe member 12 is mounted for limited longitudinal movement. The scribe member may be, for example, an ordinary refill unit for a ball point pen, which has an electrically conductive metal surface. The scribe member 12 is supported within a sleeve or bushing 22 near the lower tip of body 20, in a further central support sleeve or bushing 23, and in an upper sleeve 24. All of the sleeves are aligned and cooperate to guide the scribe member for limited inward and outward motion relative to body 20. A spring 25 acts between the sleeve 23 and a suitable abutment on the scribe member 12, urging the scribe member toward its outward or extended limit, which is defined by a stop 26 on the scribe member, engaging the end of the lower sleeve 22. The upper limit, defining the end of the inward movement of the scribe member in response to pressure on the extended tip of the scribe member, is provided by a cap 28 which closes the end of the upper sleeve 24 and limits the motion of the upper end of the scribe member as is apparent from FIG. 3.

The central sleeve 23 also provides an electrical circuit path between the metallic body of the scribe member and the circuit line 15. In the cavity between sleeves 23 and 24 there is a cylinder-like nonconductive body 30 attached to the scribe member and containing a thin metallic electrically conducting disc 32 which provides a circuit path from a small portion of the exterior of body 30 to the metal surface of the scribe member 12. In one side wall of body 20 there is mounted a small vane-like metallic sensor 35 which may for example be pivotally mounted at 36 near the surface of the body. This sensor is connected through wire 37 to a suitable source of electrical energy, positive or negative depending upon the logic system involved. For purposes of example the source is indicated as a positive electrical source. The outer end of member 35 provides one contact of an electrical sensor switch, having a fixed contact 38 to which the signal line 16 is connected.

Considering the scribe member and body in the position shown, with the scribe member extended, the switch contacts 35-38 are open, hence a low level on line 16 indicates the scribe member is down or out. Pressure on the scribe member as it is manipulated manually to prepare to form a character causes it to move inwardly toward the source of spring 25 and during this motion, the action of the insulating cylinder member 30 (upper part) against member 35 causes it to pivot (in a counterclockwise direction as shown) closing the contacts 35–38 and completing a circuit to line 16 which is then at a high level indicating the scribe member is moving in an upward direction. This in turn is an indication of the beginning of a scribing stroke. Now the disc 32 momentarily contacts the member 35 producing a signal pulse on line 15. This indicates the beginning of a scribing stroke.

At the end of a scribing stroke the body is lifted and the scribe member 12 moves downward or outward under the force of the spring. Member 35 is pivoted in the opposite direction to open the contacts 35–38, whereupon line 16 reverts to a low level indicating the downward or outward position of the scribe member. Disc 32 again contacts member 35 momentarily, producing another pulse on line 15. The second pulse on line 15 signals the end of the scribing stroke.

In the lower end of the body 20, as shown in FIG. 4, the scribe member preferably is centrally located. A small light source 40 is provided to illuminate the region around the end of the scribe member. On opposite sides of the scribe member are located photosensors 42 and 44 which illustrate light conditions immediately on either side of the scribe member as it moves within one of the cells of the matrix shown in FIG. 2. Immediately below the scribe member, roughly on a central axis, is a further photosensor 45 which also senses light conditions on the matrix during movement of the writing instrument over the matrix surface. Photosensor 42 is connected to line 17 in FIG. 1, photosensor 44 to line 18 and photosensor 45 to line 19.

Figure 2:
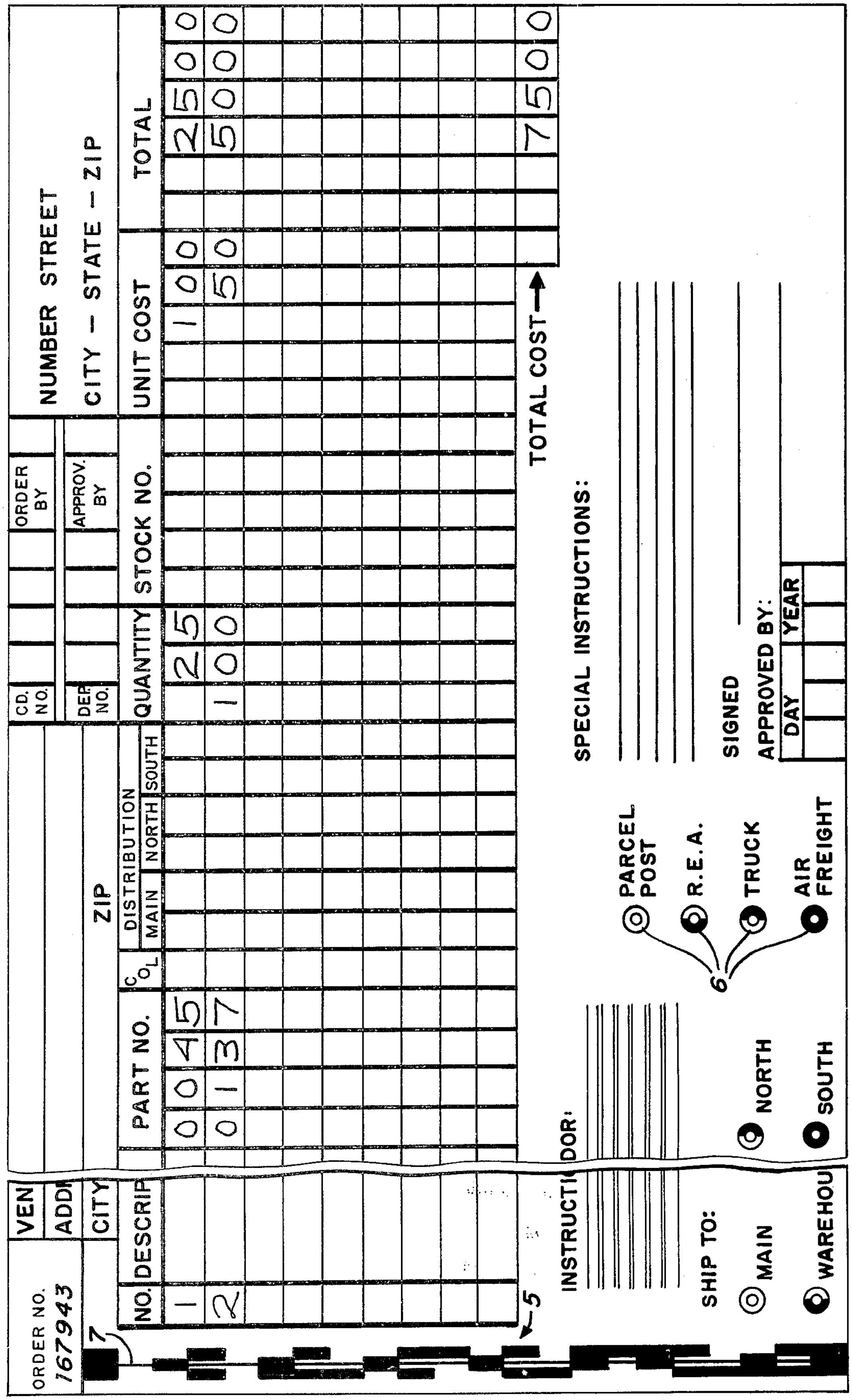
FIG. 2 shows a typical pre-printed matrix such as used in the system of this invention, shown in the form of a purchase order, with some characters entered in cells of the matrix.

Considering the use of the scribe member to write a numeral within one cell of the matrix shown in FIG. 2, it will be noted that each cell is bounded by lines having a substantially different light reflectibility than the cell area itself, e.g. black surrounding white. As the scribe is pressed into the area of the matrix, line 16 changes level, for example to a high level output from amplifier 16A. Also, a pulse is transmitted over line 15 and through amplifier 15A to its output M.

Light from lamp 40 will be reflected by the lighter region within the matrix cell to change the output of any or all of the sensors 17, 18 and 19 which receive the reflected light. Those sensors located over a borderline will not change output, at least not to a significant level within their light threshold.

Figure 1:
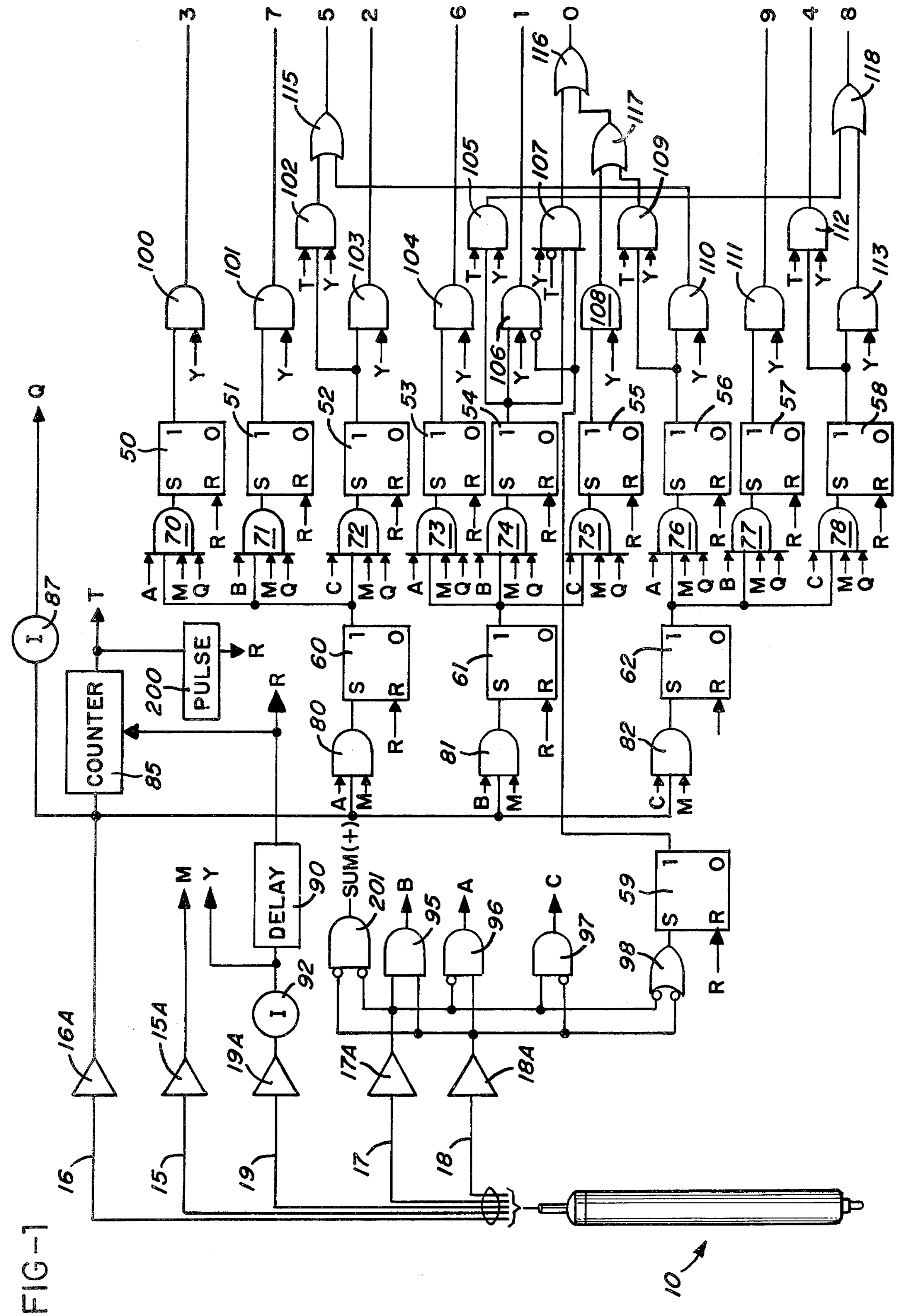
FIG. 1 is a logic diagram which includes a schematic illustration of a scribe member as provided by the invention.

FIG. 1 shows the encoding-decoding logic circuits which convert the signals on lines 15 through 19 at the beginning of a stroke, and at the end of a stroke, into decimal type outputs (high level) on an appropriate one of the output lines labelled 0 through 9. These includes a bank of registers 50–59 which can be in the form of conventional flip-flop circuits, together with auxiliary registers, flip-flops 60, 61 and 62, and various AND gates, OR gates, inverters and delay circuits, all of conventional type. Positive logic symbols are used in this embodiment.

Taking numeral 1 as an example, the light at the beginning of the single stroke (preferably top to bottom) will be reflected to all three photosensors. Consider this condition as +, +, + at the beginning of the stroke. Using numeral 2 as an example, at the beginning of the stroke the condition will be –, +, +, and so on for other numerals.

At the end of the single vertical stroke for numeral 1, the condition is +, +, +. Thus the set of signals to decode as a high level on output line 1 is + + + begin, + + + end.

Assuming the flip-flop registers have all been reset, their outputs will all be low. Each of the registers 50–58 has a set imput from a four input AND gate, 70–78. Register 59 has a set input from an OR gate 98. Registers 60, 61 and 62 have set inputs from three input AND gates 80, 81 and 82.

It will be noted from FIG. 1 that all outputs, lines 0–9, are under control of one or more of registers 50–58, and each of these registers has its input from one of the AND gates 70–78. Each of those AND gates has an input labelled M which is derived from the amplifier 15A, thus a decoding setup of the register can occur only when there is a plus output from that amplifier. This occurs only at the beginning and at the end of a stroke of the scribe member.

A high level from the output of amplifier 16A indicates the scribe member is being pressed into the matrix, and a stroke is about to be written. This signal is processed three ways; it provides one of three inputs to each of AND gates 80, 81 and 82, it drives a two count counter 85, and it drives an inverter circuit 87. The inverter output Q is applied to each of the AND gates 70–78, thus these gate circuits are inhibited when the scribe member is ready to begin to make a stroke.

Counter 85 provides a high level at its output T during the second of two strokes of the scribe member, provided the counter has not been reset. This distinguishes between single and two stroke characters, e.g. between 1 and a 5.

A reset circuit R is derived from a delay circuit 90 which is in turn driven through an inverter circuit 92 from amplifier 19A. Thus whenever the center photosensor 45 does not receive sufficient reflected light, as when it passes across a dark margin of a matrix cell or is withdrawn sufficiently away from the matrix, there is a delayed signal, and also an immediate high level signal over the inverter output Y. In addition to resetting all registers 50–62 via output circuit R, the delay output separately is connected to reset counter 85.

The outputs of amplifiers 17A and 18A are connected to the inputs of three AND gates 95, 96 and 97, and an OR gate 98, with certain of these inputs inverted as shown. If both the left and right photosensors 42 and 44 receive enough reflected light, the outputs of both amplifiers are high, AND gate 95 is enabled, and the other three gate circuits are inhibited. There is then a high level signal on circuit B, which leads to registers 71, 74, 77 and 81. If at any time during a stroke either sensor 42 or 44 has its level drop to a low level, their inverted input to OR gate 98 will cause it to set register 59.

A low level output from sensor 42 together with a high level output from sensor 44 will enable AND gate 96, causing a high level on its output circuit A. Conversely, a high level from sensor 42 together with a low level from sensor 44 will enable AND gate 97 and cause a high level on its output C.

Circuit A is connected to inputs of registers 70, 73, 76 and 80. Circuit C is connected to inputs of registers 72, 75, 78 and 82.

The AND gates 80, 81 and 82 plus registers 60, 61 and 62 provide the initial stage of decoding. These gate circuits are enabled only at the beginning of a scribing stroke. If the scribe member is centered in the matrix cell there is a high level on circuit B, and register 61 is set. If the stroke starts to the left of the cell, gate 96 is enabled, it in turn enables gate 80, and register 60 is set.

Similarly, if the stroke starts to the right of the cell, gates 97 and 82 are enabled, and register 62 is set. Since 70–78 require M which is low level during the writing, nothing more occurs during that stroke of the scribe member, except for the possible setting of register 59 if either sensor 42 or 44 moves into the border of the cell.

At the end of the stroke, the scribe member is lifted, circuit Q goes to a high level, circuit M transmits a high level pulse, and high level outputs from one of AND gates 95, 96 and 97 plus a high level output from one of registers 60, 61 and 62 will result in one of the AND gates 70–78 being enabled to set a corresponding one of the registers 50–58.

If the end of one stroke is also the end of a character, the scribe member will then be lifted from the matrix by an appreciable distance, or will be moved over to another cell. In either event, the reflected light level at the center photosensor 45 will lower, its amplifier 19A will then have a low level output, and the inverter 92 will go to a high level output. After a short period (e.g. 1/100 sec.) determined by the delay circuit 90, the reset circuit R goes to a high level and all of the registers, plus counter 85, are reset.

In the event a two stroke character is being made, the counter receives a second high level signal as the second stroke begins, and the counter 85 then provides a high level on its output circuit T, indicating a second stroke in the same cell. The output of the counter also goes into circuit 200 which momentarily pulses an output pulse to the reset circuit R resetting the registers 50–62, then returns to a low level.

Reverting to conditions at the end of the first stroke, with one of registers 50–58 set, the outputs of these registers are connected as enabling inputs to a number of decoding AND gates 100–113 and OR gates 115–118. The AND gates all have enabling inputs connections from the set (high level) outputs of registers 50–59. In the case of AND gate 106 there is also an inverted input from register 59. All of these AND gates 100–113 also have enabling inputs from the Y circuit. In addition, the AND gates 102, 105, 109 and 112 have a third enabling input from the circuit T, whereby these AND gates are actuated only when a two stroke character is being decoded.

The OR gates provide the final decoding step, where there are optional ways of making a given character such that at the end of the scribing motion required for a character (one or two strokes) there is a unique output on one of the decimal output circuits 0 through 9. Thus the trinary input code from the photosensors of the scribing member, together with the signals from the position and movement sensors, are decoded into discrete outputs which identify ten numeral characters, including optional decoding for certain characters which can be scribed in different ways. The following chart identifies the decoding scheme.

| Stroke I | | Stroke II | | |
|---|---|---|---|---|
| Start | Stop | Start | Stop | Character |
| ++ | ++ | (and register 59 not set) | | 1 |
| −+ | +− | (None) | | 2 |
| −+ | −+ | (None) | | 3 |
| | | +− | +− | 4 |
| | | −+ | +− | 5 |
| +− | −+ | (None) | | 5 (Optional) |
| ++ | −+ | (None) | | 6 |
| −+ | ++ | (None) | | 7 |
| +− | +− | (None) | | 8 |
| | | ++ | ++ | 8 (Optional) |
| +− | ++ | (None) | | 9 |
| | | +− | −+ | $\phi$ |
| ++ | +− | (None) | | 0 |
| ++ | ++ | (and register 59 set) | | 0 |

In the chart a + sign means the photosensor is receiving a high level of reflected light (i.e. seeing white) and a − sign means a low level of reflected light (i.e. seeing black). The first sign signifies the condition of the left sensor 42 and the second sign the condition of the right sensor 44.

It will be obvious from an inspection of the preceding table that a number of additional combinations are available, and not assigned, beyond those used for the ten numerals on a few extra symbols. If it is desired to expand the system to handle an alphabet, it is possible to assign these additional two-stroke codes.

Referring to FIG. 1, it will be noted that the AND gate 201 has been connected to the inverted outputs of amplifiers 17A and 18A. This gate will be enabled whenever both photosensors 42 and 44 receive a low level of reflected light. This condition will occur when the scribing unit is removed sufficiently from the writing surface or when the scribing unit is drawn by a horizontal boundary line. The outputs of the decimal output circuits 0 to 9 can be transmitted to a conventional calculator and output of the AND gate 201 can be assigned to provide the summing function, so that each time it is enabled the output of numerals received thus far by the calculator could be added to a previous subtotal. Thus as numbers would be written downward in a vertical column, each new number could be added to those already written.

Also, it is possible to expand the system by having a cooperating pair of photosensors above and below the scribe member 12, capable of sensing movement of the scribe member into promixity with the upper and lower boundary lines of the cells. The photosensors 45 can be one of such a pair, in which case the reset and output enabling signals (R and Y) will be applied to inverter 92 via an AND gate to indicate passage of both such upper and lower photosensors across a cell boundary. The additional logic circuitry will be obvious to persons skilled in the art, following the example given in FIG. 1. Such an expansion of the system can provide full alphabet capacity if such is desired.

It will be noted that by employing the same trinary code as explained above, the device described can also be used in a mode which will make it possible to record pre-printed numeric information, such information having been coded to correspond to a given number. For example, in FIG. 2 the reference 5 refers to such encoded information. By drawing the scribing device 10 along the line 7 of FIG. 2 in a downward direction, the order number 167943 could be entered into the same recorder utilizing basically the same logic of FIG. 1. Some minor changes in the uses of the various sensors could be made so that the scriber would not have to be lifted during this operation. For instance, while using the scriber in this mode, the signal from 16A would be constantly on. The output of AND gate 201 could replace 19A as providing the end of character and reset signals. The output of 19A could in turn replace the output of 16A to distinguish between the beginning and end of the two bit code. In this way, certain numbers which are standard or could be coded onto a particular form or writing surface, can quickly be entered into the system without having to copy them.

Furthermore, a simplified code using only a multiple choice among, for instance, four combinations is illustrated by the reference 6 in FIG. 2. By using the appropriate photosensors, a simple "dot" placed in one of the four central circles can simultaneously be recorded. This is accomplished by simply recording the outputs of one of the AND gates 95, 96, 97 or 201. In this way, certain kinds of information can be rapidly entered into the system.

FIGS. 6 and 7 illustrate another form of apparatus incorporating some concepts and principles of the invention. For purposes of description, as shown in FIG. 7, a matrix is employed using six position points surrounding each matrix cell. Numerals and/or letters can be scribed in a cell, each having a different combination of beginning and ending locations at the position points.

The scribe member 10a is constructed in a simpler fashion. The photoelectric sensors and switches such as described in the first embodiment (FIG. 3) are not utilized. The scribe member itself forms part of an electrical sensing circuit through input wire 150. Each of the position points about each cell is identified with a unique electrical circuit. For example, a guide, as in the form of a stencil 152 having outlets 153 from the cell boundary, can be placed over the matrix cells, with the scribe member operating within the guide, and coming into contact with one or more of the contact members **154*a*–154*f* positioned in the different outlet locations as shown in FIG. 7.**

Each of these contact members is connected to a unique output line, with the lines extending through cable 155 to appropriate registers (not shown). Thus, if the writer follows the format for characters as shown in FIG. 7, he will complete a circuit between the input line 150 and one of the output lines in cable 155 only at the beginning and/or end of a character. These signals will be effective only so long as the scribe member is in contact with the matrix, therefore the combination of unique signals at the beginning and at the end of a stroke will identify a particular character.

Obviously different forms of this arrangement can be employed, as by using pressure sensitive electrical switching devices, or light level sensitive switches, located beneath the matrix in each of the unique position points. By increasing the number of such points, it is also possible to expand the character capacity of the system.

It should also be noted that in this form of the invention a stroke may be identified by having only one terminus at a position point. This is true, for example, for the numerals 8 and 0 as shown in FIG. 7. Likewise, further unique codes available from the system as shown, would be stroke beginning or ending within the cell and having a unique terminus, such as at points 154*d*, 154*e*, or 154*f*. By increasing the number of position points, the capacity of the system can be increased accordingly.

In addition, since type of format shown in FIG. 7 identifies each character by one or more unique terminus points, it is possible to read and identify the characters after they are written, as well as encoding and storing (or processing) them during scribing. Thus this form of the system also provides for mechanized character recognition as well.

The sheet 160 may have the cells outlined thereon as by ovals 162, and the position points can be indicated by marks, although this is not essential. A reading head 170 can then be aligned with the individual cells, and a plurality of photosensors or the like, 172*a*–172*f* will sense markings within the region of the respective position points. The resulting signals are transmitted to registers 174 and thence to decoding circuits to provide unique character identification.

In the example shown, photosensors 172*c* and 172*f* would sense a mark, the others would not, and this would identify the numeral 2. The remainder of the human readable numeral, within the cell, would have no effect on the reader.

Thus, the invention also encompasses a method of hand scribing characters which is susceptible of real time encoding and/or processing, and also useful in subsequent character recognition and processing equipment. This method is of particular significance since it allows the writing or scribing of characters in human readable form, quite similar to normal writing. As long as these characters are properly located in the matrix cells, and the writer learns the simple rules or procedures which deviate from normal writing, the writer can easily adapt to the system.

While the method and forms of apparatus herein described constitute preferred embodiments of the invention, it is to be understood that the invention is not limited to this precise method and forms of apparatus, and that changes may be made therein without departing from the scope of the invention which is defined in the appended claims.

What is claimed is:

1. The method of recording characters which are both human readable and automatically recordable, comprising the steps of a. providing a matrix member having divisions into cells with definite boundaries in which the characters are scribed, b. scribing human readable characters in the cells with one or more strokes of a scribe member, the scribing strokes having predetermined termini adjacent the cell boundaries which are unique to the particular character, c. sensing only the termini of the scribing strokes, and d. translating the sensed termini into character identification codes.

2. The method of claim 1 wherein step (b) includes marking the termini of the scribing strokes at predetermined locations outside the cell boundaries.

3. The method of claim 1 wherein step (b) includes confining the scribing strokes to within the cell boundaries and sensing the location of the scribe member with respect to such boundaries at the termini of the stroke or strokes required to form a character.

4. The method of claim 1 wherein steps c) and d) include c. encoding the position of the scribe member at the termini of the scribing stroke or strokes, d. translating the sequential positional codes thus obtained into a unique character identification code.

5. The method of claim 4, including the additional step of e. sensing movement of the scribing member to another cell and producing from such movement a signal to prepare for recording the stroke termini of the scribe member in forming another character and a signal indicating the previous character is complete.

6. The method of claim 5, including the additional step of f. storing character codes identifying numerals in a storage device and developing a separate signal to sum sequentially scribed numerals.

7. Apparatus for translating scribing motion of a scribe member into signals defining characters, comprising a scribe member, means defining a matrix having cells within the boundaries of which the characters are scribed, means for generating at least one unique signal identifying the position of said scribe member only at the terminal of one or more scribing strokes by which a human readable character is formed in said cells, and decoding means constructed to translate said signals into a further signal identifying a unique character.

8. Apparatus as defined in claim 7 wherein said unique signals are two bit trinary codes.

9. Apparatus as defined in claim 7 wherein said scribe member is provided with sensors for sensing the position of said scribe member with respect to the center and the opposite sides of a cell and for sensing the beginning and the end of a scribing stroke.

10. Apparatus as defined in claim 7 wherein said scribe member and said matrix have cooperating means for generating said unique signals.

11. Apparatus as defined in claim 7 including a means identifying unique termini locations adjacent the boundaries of each cell whereby scribing strokes may be extended to such locations, and means for sensing the presence and absence of markings at said locations to generate character identification codes.

12. Apparatus as defined in claim 11, wherein said sensing means has an operating connection with said scribe member to cause generation of character identification codes contemporaneously with the complete scribing of the human readable characters.

13. A recording system wherein manual movements of a scribe member to write characters on a sheet are simultaneously recorded in machine readable fashion; said system comprising:

means defining a matrix on which individual characters are to be written, the matrix having a plurality of distinct cell locations within which individual characters are located, a hand held instrument including a body and a scribe member for tracing characters on said matrix, cooperating means on said matrix defining means and on said body producing unique signals identifying the locations of the termini of one or more strokes made by said scribe member in the act of writing characters in said cells, and recording means connected to receive and to record said signals.

14. A system as described in claim 13, including means in said instrument operable to signal the beginning and end of a scribing stroke made by said scribe member.

15. A system as described in claim 13, including means for displaying the recorded signals.

16. A system as defined in claim 13 including additional cooperating means on said body and said matrix for indicating the movement of said scribe member to another cell.

17. A system as defined in claim 13 including a calculator connected to said recording means and arranged to sum individual numerals recorded in the cells whereby a succession of numerals is totalled while the numerals are recorded.

18. A system as defined in claim 13 wherein said matrix also includes preprinted markings in a code from such that motion of said scribe member over such markings will produce signals corresponding to characters and functions represented by such markings.

19. A device for translating manual scribing motion on a sheet into signals defining characters, comprising an elongated body adapted for manual manipulation, a scribe member mounted in said body for movement between two positions, means urging said scribe member into one of said positions and yieldable in response to scribing pressure on said scribe member to allow it to move to the other position, first sensor means responsive to movement of said scribe member into one or the other of said positions, second sensor means responsive to each change in position of said scribe member, and third and fourth sensor means located on opposite sides of said scribe member and arranged to respond to markings on the sheet.

20. A device as defined in claim 19, including logic circuits connected to receive input signals from all of said sensor means representing the termini of said scribe member in forming characters on the sheet, said logic circuits being operable to translate said input signals into character identification signals.

21. A device for translating manual scribing motion within defined cells on a sheet into signals defining characters, comprising an elongated body adapted for manual manipulation, a scribe member mounted in said body for movement between scribing and non-scribing positions, first sensor means responsive to movement of said scribe member into the scribing position, additional cooperating sensor means on said scribe member and associated with the cells on the sheet and operable to produce signals identifying the termini of movements of the scribe member while making character scribing strokes within a cell.

* * * * *